US007019265B2

(12) United States Patent
Coleman

(10) Patent No.: US 7,019,265 B2
(45) Date of Patent: Mar. 28, 2006

(54) TURNTABLE INCORPORATING HEATING MEANS AND OVEN INCORPORATING THE SAME

(75) Inventor: Gavin John Coleman, Bromsgrove (GB)

(73) Assignee: Ceramaspeed Limited, (GB)

( * ) Notice: Subject to any disclaimer, the term of this patent is extended or adjusted under 35 U.S.C. 154(b) by 0 days.

(21) Appl. No.: 10/498,171

(22) PCT Filed: Dec. 3, 2002

(86) PCT No.: PCT/GB02/05465

§ 371 (c)(1), (2), (4) Date: Nov. 15, 2004

(87) PCT Pub. No.: WO03/051089

PCT Pub. Date: Jun. 19, 2003

(65) Prior Publication Data

US 2005/0061794 A1 Mar. 24, 2005

(30) Foreign Application Priority Data

Dec. 11, 2001 (GB) .................................... 0129559

(51) Int. Cl.

| | |
|---|---|
| *F24C 7/02* | (2006.01) |
| *A21B 1/26* | (2006.01) |
| *A21B 1/14* | (2006.01) |
| *H05B 6/78* | (2006.01) |

(52) U.S. Cl. ...................... 219/396; 219/392; 219/395; 219/658; 219/400; 219/411

(58) Field of Classification Search ..................... None
See application file for complete search history.

(56) References Cited

U.S. PATENT DOCUMENTS

| | | | | |
|---|---|---|---|---|
| 3,095,186 | A * | 6/1963 | Sondy | 432/32 |
| 3,636,299 | A * | 1/1972 | Stewart, Jr. | 219/201 |
| 4,326,113 | A * | 4/1982 | Toyoda et al. | 219/685 |
| 4,369,346 | A | 1/1983 | Hart et al. | |
| 6,354,194 | B1 * | 3/2002 | Hedrington et al. | 99/341 |

FOREIGN PATENT DOCUMENTS

| | | | |
|---|---|---|---|
| CN | 1465888 | A * | 1/2004 |
| EP | 0478082 | | 4/1992 |
| EP | 1058483 | | 12/2000 |
| GB | 2383126 | A * | 6/2003 |
| JP | 09199273 | A * | 7/1997 |

OTHER PUBLICATIONS

Patents Abstracts of Japan Publication No. 2000271789.
International Search Report May 27, 2003.

* cited by examiner

*Primary Examiner*—Joseph Pelham
(74) *Attorney, Agent, or Firm*—Ira S. Dorman

(57) ABSTRACT

A turntable (19) for an oven comprising a surface for heating a food item (27, 75) placed on the turntable (19), wherein the turntable (19) is provided with integral heating means (29). The turntable may be incorporated into an oven cavity (17, 67) of an oven.

26 Claims, 4 Drawing Sheets

FIG 8
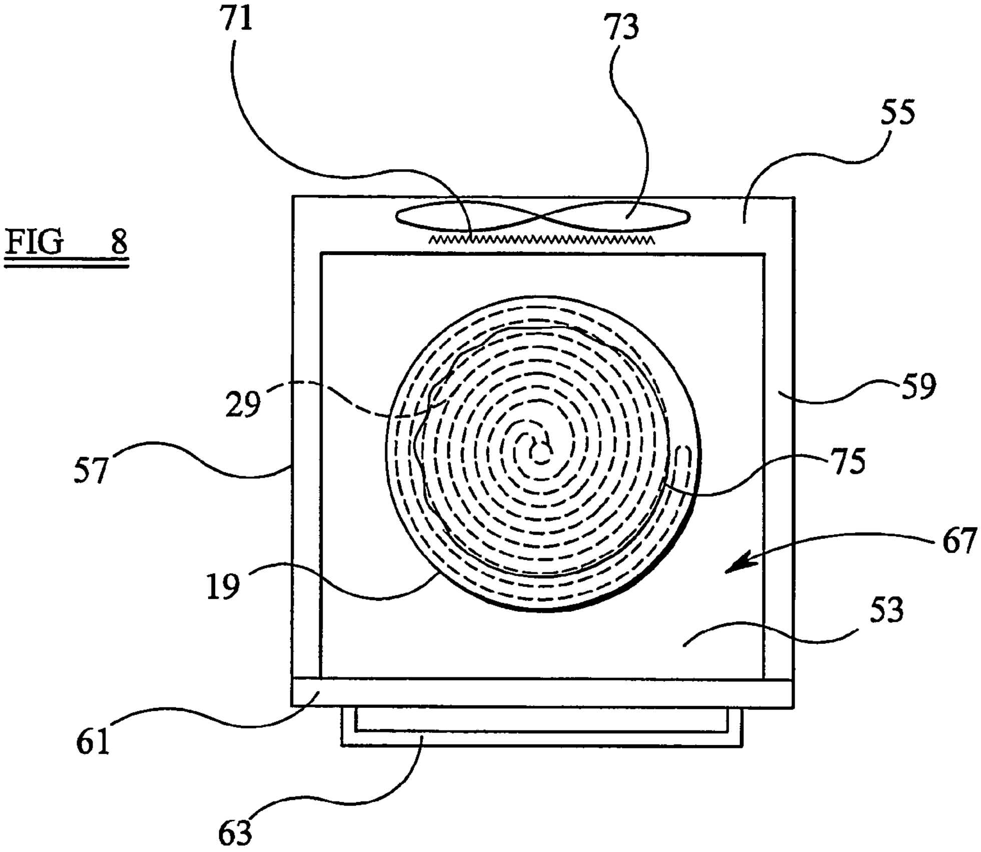
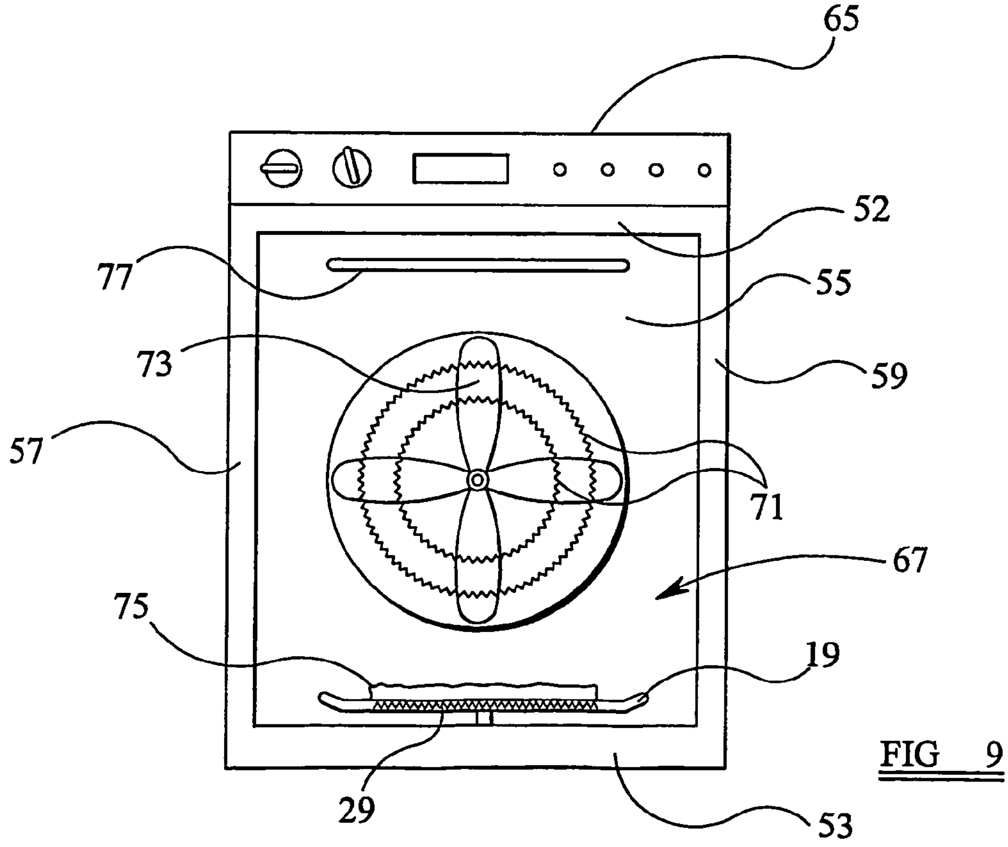
FIG 9

TURNTABLE INCORPORATING HEATING MEANS AND OVEN INCORPORATING THE SAME

This invention relates to an oven incorporating a turntable incorporating heating means.

Ovens, such as microwave ovens and fan-assisted ovens, generally have one or more main heating means at the top or in an upper region of an oven cavity. Nevertheless, it is known to incorporate an auxiliary heating means in the region of the base of the oven cavity. Such an auxiliary heating means is generally employed because current rapid cook ovens, such as microwave ovens and top-grill ovens, cook the top and upper region of a food item placed in the oven cavity more effectively than the bottom or lower region thereof.

It has been proposed to arrange an auxiliary heating means beneath the lower wall of the oven cavity of a microwave oven, but such an arrangement has the disadvantage that it is necessary first to heat the base of the oven cavity and then to rely on convection and conduction from the base to the food item being cooked. In cases where the oven is provided with a turntable, the turntable forms a further barrier to the transfer of heat to the food item being cooked.

It has also been proposed to provide an auxiliary heating means within the oven cavity of a microwave oven. Such an arrangement is known, for example, from U.S. Pat. No. 3,172,987 and U.S. Pat. No. 4,326,113. According to U.S. Pat. No. 3,172,987 a sheathed resistance heating element is mounted slightly above the base of an oven cavity beneath a turntable. A similar arrangement is shown in U.S. Pat. No. 4,326,113 except that the sheathed heating element substantially protrudes beyond the periphery of the turntable. The arrangement of a sheathed heating element within the oven cavity has the disadvantage that the heating element is relatively exposed and readily becomes soiled, while being relatively difficult to clean.

It has further been proposed in U.S. Pat. No. 4,132,216 to provide a hot-air oven for heating food-loaded cartridges which are arranged in an annular array on a turntable. Air is heated at the top of the oven cavity and blown by a propeller into the hollow core formed by the annular array, such that part of the air passes through holes in the cartridges and past food containers therein, while the remainder of the air passes through a flow passage beneath the cartridges and above the turntable. The arrangement of a heating element and a propeller within the oven cavity gives rise to the disadvantage that the internal components are difficult to clean, while the propellor is potentially dangerous and requires to be shielded from the user.

It is therefore an object of the present invention to provide an oven which overcomes or ameliorates the above disadvantages.

According to the present invention there is provided an oven comprising an oven cavity, a main heating means for heating a food item, and a turntable arranged in a lower region of the oven cavity and comprising a surface for heating a food item placed on the turntable, wherein the turntable is provided with integral electrical heating means and with electrically-conductive means for connecting the integral electrical heating means to a source of electrical power.

The heating means may comprise an elongate electrically conducting material embedded into the turntable, for example into a lower surface thereof.

Alternatively, the heating means may comprise a thick film heating element, for example applied to an underside and/or an upper surface of the turntable.

As a further alternative, the heating means may comprise a heating element wrapped around an insulating board, such as of mica.

The turntable may include a layer of thermal insulation material on a lower surface thereof.

According to another alternative, the heating means may comprise a heating element provided within a dish-like support containing a base layer of thermal insulation material. The base layer may comprise microporous thermal and electrical insulation material. The heating element may be supported relative to the base layer.

The heating element may comprise a corrugated metal ribbon mounted edgewise on the base layer and secured by partial embedding and/or a coiled wire or coiled ribbon secured to the base layer and/or a lamp mounted above the base layer and/or a sheathed heating element and/or a resistance element mounted within a glass tube.

A peripheral wall of thermal insulation material may extend around the internal periphery of the dish-like support.

The heating power output of the heating means may increase with increasing distance from an axis of rotation of the turntable.

The turntable may include conductive tracks connected to the heating means for supplying power to the heating means. The conductive tracks may be in the form of annular tracks provided on an underside of the turntable and/or may be provided around the periphery of a support shaft provided on an underside of the turntable.

The main heating means may comprise a magnetron or a resistance heating element and fan means for propelling air past the heating element and into the oven cavity. The main heating means may further comprise a grill element for directing radiation downwardly towards the food item.

For a better understanding of the present invention and to show more clearly how it may be carried into effect reference will now be made, by way of example, to the accompanying drawings in which:

FIG. 8 is a plan view of an embodiment of a fan-assisted oven provided with a turntable incorporating heating means according to the present invention, the top of the oven being removed for clarity; and FIG. 9 is a front elevational view of the fan-assisted oven of FIG. 8 with the door removed for clarity.

Figure 1:
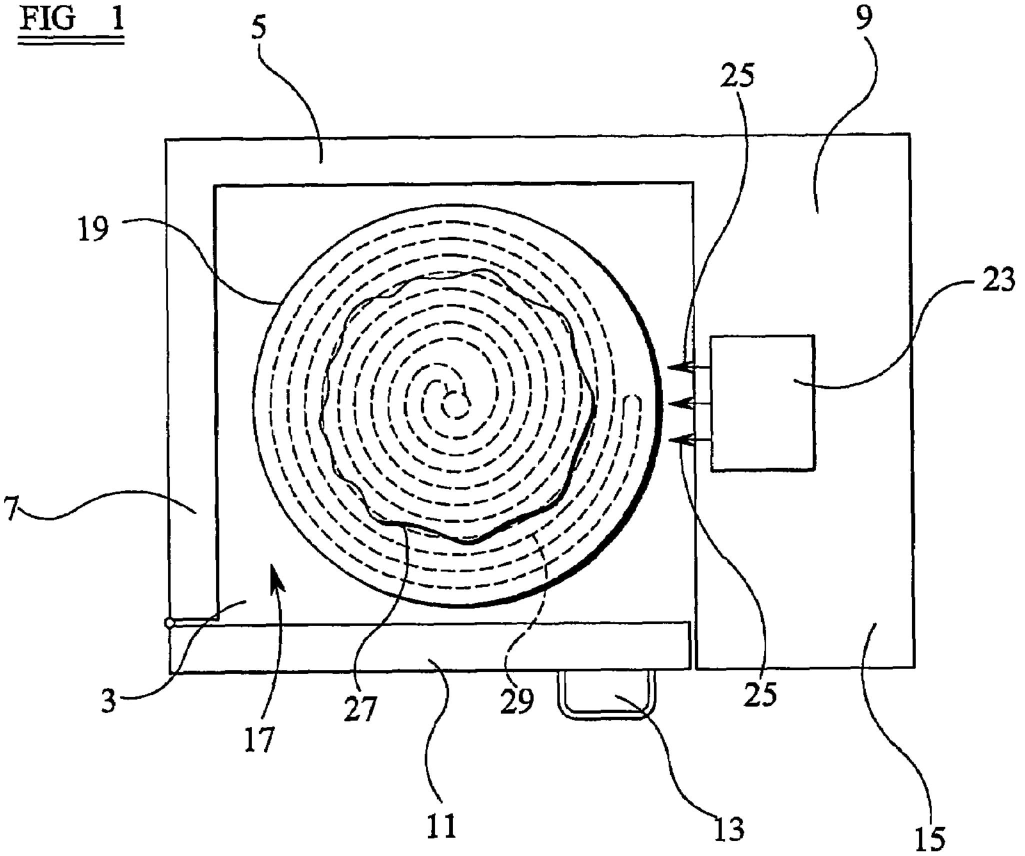
FIG. 1 is a plan view of an embodiment of a microwave oven provided with a turntable incorporating heating means according to the present invention, the top of the oven being omitted for clarity.
Figure 2:
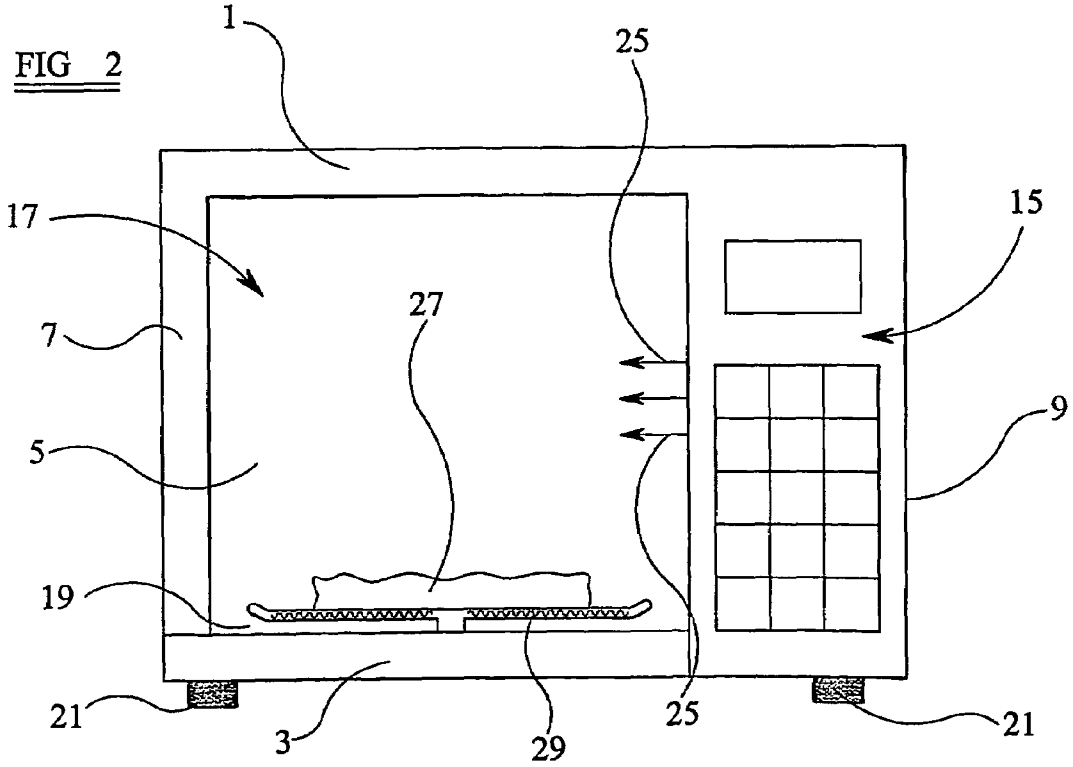
FIG. 2 is a front elevational view of the microwave oven shown in FIG. 1 with the door removed for clarity.

The microwave oven shown in FIGS. 1 and 2 comprises a body having a top 1, a base 3, a back 5, side walls 7 and 9 and a door 11 provided with a handle 13 for opening and closing the door. A control panel 15 is provided for controlling operation of the oven. Provided within an oven cavity 17 is a turntable 19 which is rotatable in known manner when the oven is in operation. A plurality of feet 21 are provided beneath the oven body to support the oven on a suitable surface (not shown).

A magnetron, shown diagrammatically at 23, is provided in a chamber behind the control panel 15 and functions as a main heating means to supply microwaves in known manner into an upper region of the oven cavity 17 as indicated by arrows 25. The microwaves are very effective in heating the upper part of a food item 27, but are not as effective in heating the lower part of the food item.

The upper part of food item 27 may additionally be heated with a grill heater (not shown) provided in the top 1 of the oven body and directed downwardly onto the upper part of the food item.

However, while the magnetron and a grill if provided effectively heat the upper part of the food item, the lower part of the food item is not effectively heated and this can lead either to the upper part of the food item being over-cooked or the lower part of the food item being under-cooked. Either case is visually undesirable, while under-cooking of the lower part of the food item can be hazardous to health.

According to the present invention there is integrated into the base of the turntable 19 an auxiliary heater 29. The auxiliary heater 29 is not required to provide heat to the entire oven cavity, only to the lower region of food item 27. Thus the power output of the auxiliary heater can be relatively low, for example 200 watts.

Figure 3:
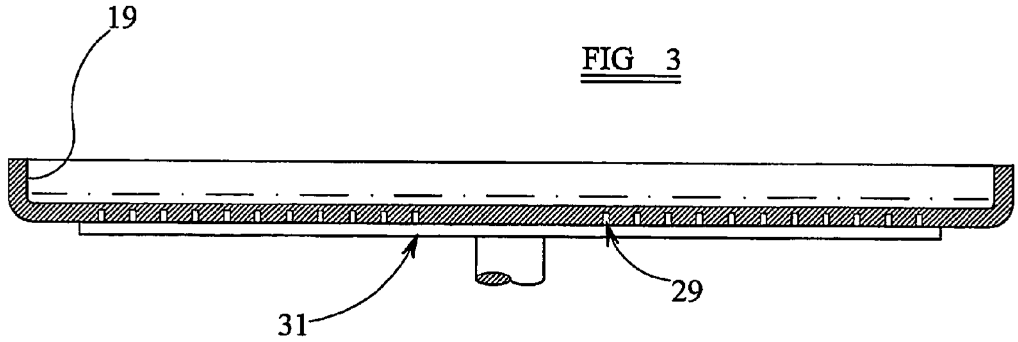
FIG. 3 shows on a larger scale one embodiment of a turntable for use with the microwave oven of FIGS. 1 and 2.

One embodiment of the auxiliary heater 29 shown in FIGS. 1 and 2 is illustrated in more detail in FIG. 3 and comprises an elongate strip of electrically conducting material embedded into the lower surface of the turntable. Alternatively, the auxiliary heater may comprise a thick film heater applied to the lower or upper surface of the turntable, or a heating element wrapped around an insulating board, such as of mica, and arranged at a lower surface of the turntable. If desired a layer of thermal and/or electrical insulation material 31 may be provided on the lower face of the turntable 29. Because the heat output of the auxiliary heater 29 is relatively low, the material of the turntable need not have high-temperature-resistant properties and may be, for example, a relatively low-temperature glass such as borosilicate glass, for example that sold under the trade mark Pyrex.

Figure 4:
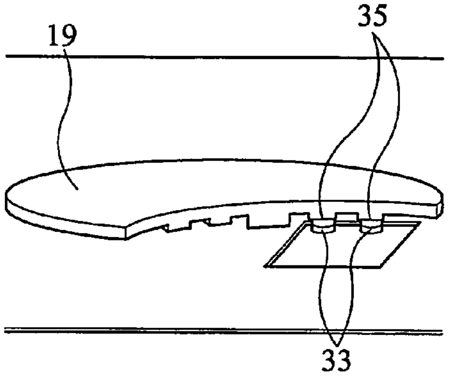
FIGS. 4 and 5 show one way in which the heating means of the turntable of FIG. 3 can be connected to a supply of electricity.

Electrical power to the auxiliary heater may be provided in a number of ways. For example, as shown in FIG. 4, which shows part only of the turntable 19, brushes or spring-biased contacts 33 may be provided in the base of the oven cavity and may contact annular electrically-conductive tracks 35 provided on the underside of the turntable 19. If required, the brushes or contacts 19 may be provided with means (not shown) for cutting electrical power thereto in the event the turntable 19 is removed from the oven cavity.

Figure 5:
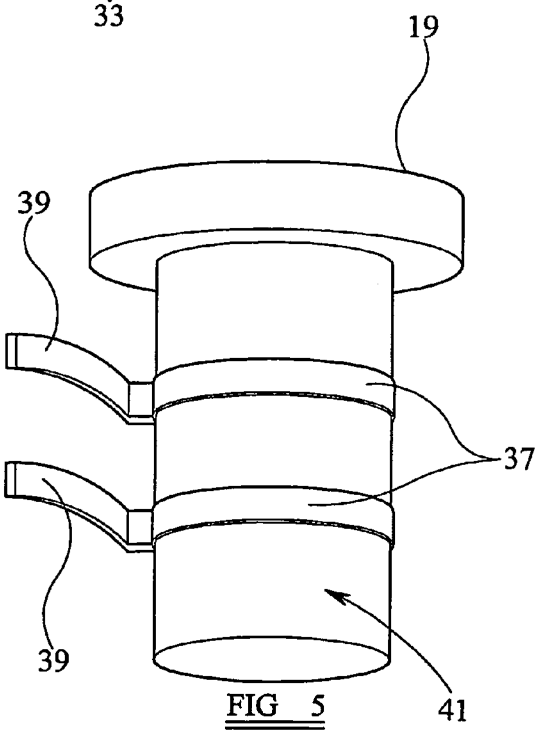

Alternatively, as shown in FIG. 5, which also shows part only of the turntable 19, electrical power for the auxiliary heater 29 may be provided by slip ring connectors in the form of peripheral electrically-conductive tracks 37 may be provided on a rotatable shaft 41 on which the turntable is supported, which tracks may be contacted by brushes or spring-biased contacts 39.

Figure 6:
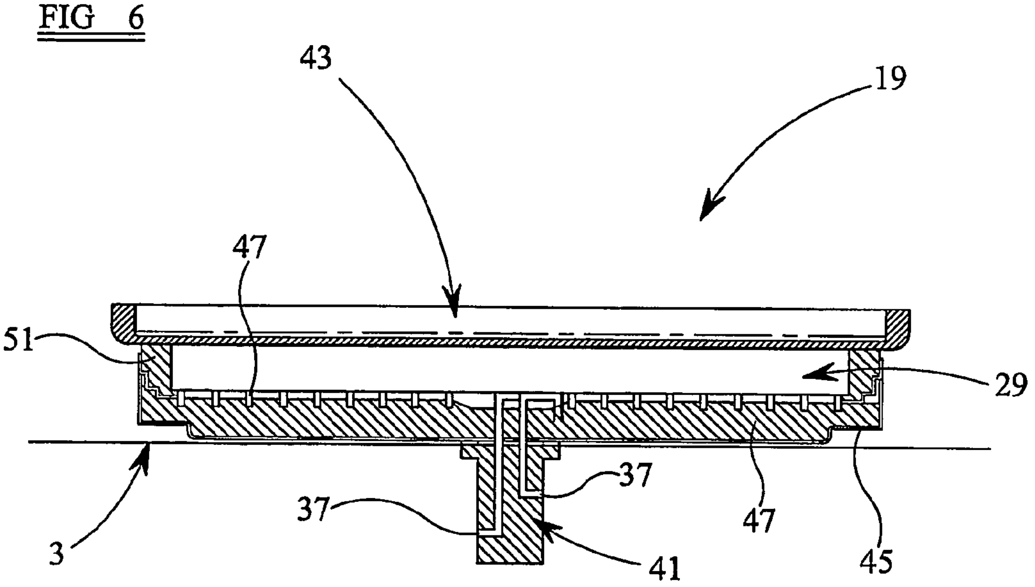
FIGS. 6 and 7 show another embodiment of a turntable for use with the microwave oven of FIGS. 1 and 2.
Figure 7:
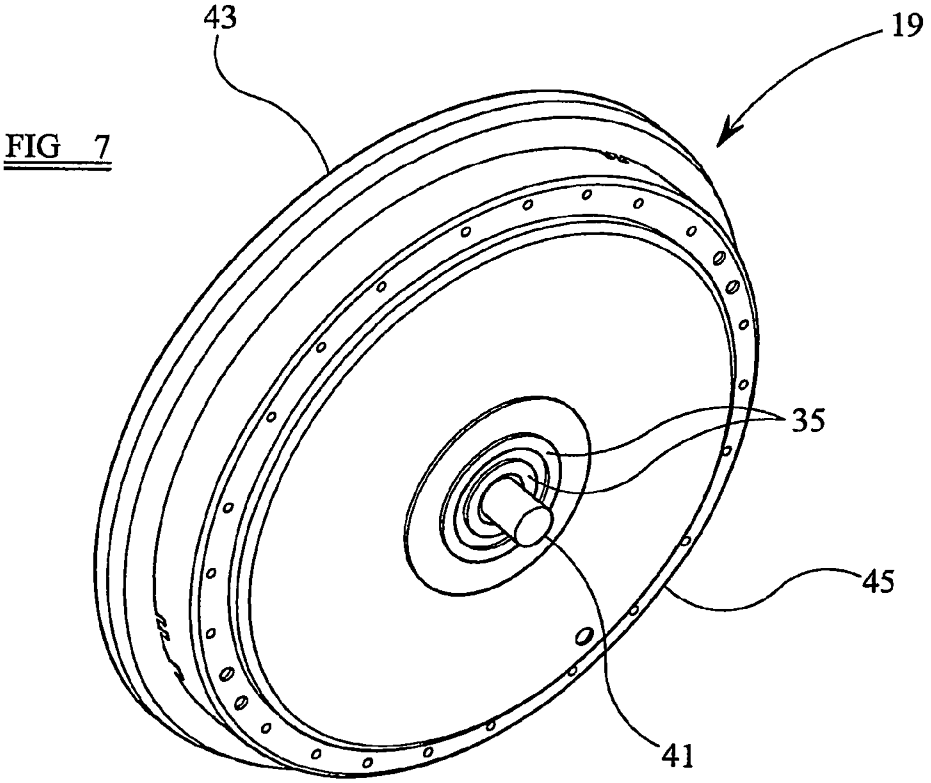

FIGS. 6 and 7 show an alternative form of construction of turntable incorporating an auxiliary heater 29, FIG. 6 employing the slip ring connectors of FIG. 5 and FIG. 7 employing the electrically-conductive tracks of FIG. 4 provided on the lower surface of the auxiliary heater.

The turntable 19 shown in FIGS. 6 and 7 comprises an upper, slightly dished member 43, for example of glass, glass ceramic or other suitable material and an auxiliary heater 29 mounted beneath the dished member and secured thereto. The heater 29 is rotatably mounted on a shaft 41 so as to be spaced above the base 3 of the oven.

The auxiliary heater 29 comprises a dish-like support 45, for example of metal or other suitable material, provided with a base layer 47 of thermal insulation material, such as microporous thermal and electrical insulation material. A heating element 49 is provided secured relative to the base layer 47. As shown, the heating element 49 comprises a corrugated metal ribbon mounted edgewise on the base layer 47 and secured by partial embedding in the base layer. Such a heating element is well known to the skilled person. The heating element could alternatively be of coiled wire or coiled ribbon secured to the base layer or of lamp form mounted above the base layer, or a sheathed heating element of well known form, or a wire resistance element mounted within a glass or quartz tube. Clearly, the internal configuration of the dish-like support may require modification depending on the nature of the heating element employed.

A peripheral wall 51 of thermal insulation material is provided in the heater and extends around the internal periphery of the dish-like support. As shown, the peripheral wall may be separate from the base layer 47, but the peripheral wall could alternatively be provided integral with the base layer, as is well known in the art.

The dish-like support 45 is substantially circular and underlies the majority of the dished member 43, including the area immediately above the shaft 41.

The turntable 19 can be removed for cleaning and is interchangeable with alternative turntables (which may or may not be heated) or alternative heating means.

The heating power output of the auxiliary heater 29 preferably increases as the distance from the axis of the turntable increases so as to provide substantially even heating of the food item irrespective of the distance from the axis of the turntable.

The fan-assisted oven shown in FIGS. 8 and 9 comprises a body having a top 52, a base 53, a back 55, side walls 57 and 59 and a door 61 provided with a handle 63 for opening and closing the door. A control panel 65 is provided for controlling operation of the oven. Provided within an oven cavity 67 is a turntable 19 which is rotatable in known manner when the oven is in operation.

A main heating element 71 is provided behind the back 55 of the oven cavity and a fan 73 propels air past the heating element and distributes the hot air around the oven cavity for relatively even heating of the top and sides of a food item 75 to be heated. The hot air from the main heating element 71 is very effective at heating the upper part of a food item 75, but is not as effective at heating the lower part of the food item.

The upper part of food item 75 may additionally be heated with a grill heater 77 provided in the region of the top 51 of the oven body and directed downwardly onto the upper part of the food item.

However, while the hot air from main heating element 71 and grill 77 if energised effectively heat the upper part of the food item 75, the lower part of the food item is not effectively heated and this can lead either to the upper part of the food item being over-cooked or the lower part of the food item being under-cooked. Either case is visually undesirable, while under-cooking of the lower part of the food item can be hazardous to health.

As with the microwave oven described hereinabove, an auxiliary heater 29 is integrated into the base of the turntable 19. The auxiliary heater 29 is as shown in FIGS. 3 to 7 as described in more detail hereinabove.

The invention claimed is:

1. An oven comprising an oven cavity, a main heating means for heating a food item, and a turntable arranged in a lower region of the oven cavity and comprising a surface for heating a food item (27, 75) placed on the turntable (19), wherein the turntable (19) is provided with integral electrical heating means (29) and with electrically-conductive means for connecting the integral electrical heating means to a source of electrical power.

2. An oven as claimed in claim 1, wherein the heating means (29) comprises an elongate electrically conducting material embedded into the turntable.

3. An oven as claimed in claim 2, wherein the heating means is embedded into a lower surface of the turntable.

4. An oven as claimed in claim 1, wherein the heating means comprises a thick film heating element.

5. An oven as claimed in claim 4, wherein the thick film heater is applied to an underside of the turntable.

6. An oven as claimed in claim 4, wherein the thick film heater is applied to an upper surface of the turntable.

7. An oven as claimed in claim 1, wherein the heating means comprises a heating element wrapped around an insulating board.

8. An oven as claimed in claim 7, wherein the board comprises mica.

9. An oven as claimed in claim 1, wherein a layer of thermal insulation material (31) is included on a lower surface of the turntable.

10. An oven as claimed in claim 1, wherein the heating means comprises a heating element (49) provided within a dish-like support (45) containing a base layer (47) of thermal insulation material.

11. An oven as claimed in claim 10, wherein the base layer (47) comprises microporous thermal and electrical insulation material.

12. An oven as claimed in claim 10, wherein the heating element (49) is supported relative to the base layer.

13. An oven as claimed in claim 12, wherein the heating element (49) comprises a corrugated metal ribbon mounted edgewise on the base layer (47) and secured by partial embedding.

14. An oven as claimed in claim 12, wherein the heating element (49) comprises means selected from a coiled wire and a coiled ribbon secured to the base layer (47).

15. An oven as claimed in claim 12, wherein the heating element (49) comprises a lamp mounted above the base layer (47).

16. An oven as claimed in claim 12, wherein the heating element (49) comprises a sheathed heating element.

17. An oven as claimed in claim 12, wherein the heating element (49) comprises a resistance element mounted within a glass tube.

18. An oven as claimed in claim 10 wherein a peripheral wall (51) of thermal insulation material is included extending around the internal periphery of the dish-like support (45).

19. An oven as claimed in claim 1, wherein the heating power output of the heating means (29) increases with increasing distance from an axis of rotation of the turntable.

20. An oven as claimed in claim 1 wherein conductive tracks (35, 37) connected to the heating means are included for supplying power to the heating means.

21. An oven as claimed in claim 20, wherein the conductive tracks (35) are in the form of annular tracks provided on an underside of the turntable (19).

22. An oven as claimed in claim 20, wherein the conductive tracks (37) are provided around the periphery of a support shaft (41) provided on an underside of the turntable (19).

23. An oven as claimed in claim 1, wherein the main heating means comprises a magnetron (23).

24. An oven as claimed in claim 1, wherein the main heating means comprises a resistance heating element (71) and fan means (73) for propelling air past the heating element (71) and into the oven cavity (67).

25. An oven as claimed in claim 24, wherein the main heating means further comprises a grill element (77) for directing radiation downwardly towards the food item.

26. An oven as claimed in claim 24, wherein the main heating means further comprises a grill element for directing radiation downwardly towards the food item.

* * * * *